US008318882B2

(12) United States Patent
Fechner et al.

(10) Patent No.: US 8,318,882 B2
(45) Date of Patent: *Nov. 27, 2012

(54) ANIONIC WATER-SOLUBLE ADDITIVES BASED ON ALLYL ETHER AND VINYL ETHER

(75) Inventors: Bjoern Fechner, Eppstein (DE); Carsten Schaefer, Muehldorf am Inn (DE); Alexander Woerndle, Frankfurt am Main (DE)

(73) Assignee: Clariant Finance (BVI) Limited, Tortola (VG)

( * ) Notice: Subject to any disclaimer, the term of this patent is extended or adjusted under 35 U.S.C. 154(b) by 224 days.

This patent is subject to a terminal disclaimer.

(21) Appl. No.: 12/674,103

(22) PCT Filed: Jul. 23, 2008

(86) PCT No.: PCT/EP2008/006022
§ 371 (c)(1),
(2), (4) Date: Feb. 18, 2010

(87) PCT Pub. No.: WO2009/024234
PCT Pub. Date: Feb. 26, 2009

(65) Prior Publication Data
US 2011/0213094 A1    Sep. 1, 2011

(30) Foreign Application Priority Data
Aug. 23, 2007   (DE) .................. 10 2007 039 784

(51) Int. Cl.
*C08F 118/02*   (2006.01)
*C08F 124/00*   (2006.01)
*C08F 226/06*   (2006.01)

(52) U.S. Cl. ........ 526/319; 526/240; 526/277; 526/287; 526/312; 526/320

(58) Field of Classification Search .................. 526/319, 526/240, 277, 287, 312, 320
See application file for complete search history.

(56) References Cited

U.S. PATENT DOCUMENTS

| | | | | |
|---|---|---|---|---|
| 5,798,425 | A * | 8/1998 | Albrecht et al. | 526/271 |
| 6,211,317 | B1* | 4/2001 | Albrecht et al. | 526/271 |
| 7,905,955 | B2 | 3/2011 | Fechner et al. | |
| 7,938,900 | B2 | 5/2011 | Fechner et al. | |
| 2002/0019459 | A1* | 2/2002 | Albrecht et al. | 523/161 |
| 2003/0209695 | A1* | 11/2003 | Tsuzuki et al. | 252/363.5 |
| 2005/0085563 | A1 | 4/2005 | Esselborn et al. | |
| 2010/0137536 | A1 | 6/2010 | Fechner et al. | |
| 2010/0137537 | A1 | 6/2010 | Fechner et al. | |
| 2011/0065879 | A1 | 3/2011 | Fechner et al. | |
| 2011/0107803 | A1 | 5/2011 | Fechner et al. | |
| 2011/0185781 | A1 | 8/2011 | Fechner et al. | |
| 2011/0244385 | A1 | 10/2011 | Fechner et al. | |

FOREIGN PATENT DOCUMENTS

| | | |
|---|---|---|
| DE | 10017667 | 10/2001 |
| EP | 0736553 | 10/1996 |
| EP | 0894811 | 2/1999 |
| EP | 1142972 | 10/2001 |
| JP | 57194038 | 11/1982 |

OTHER PUBLICATIONS

PCT International Search Report for PCT/EP2008/006022, mailed Dec. 22, 2008.
English Abstract for JP 57194038, Nov. 29, 1982.
English Translation of the PCT International Preliminary Report on Patentability for PCT/EP 2008/006022, mailed Jul. 8, 2010.

* cited by examiner

*Primary Examiner* — Michael M Bernshteyn
(74) *Attorney, Agent, or Firm* — Anthony A. Bisulca

(57) ABSTRACT

The invention relates to anionically modified copolymers that can be obtained by the polymerization of the monomers (A), (B) and (C), obtaining non-ionic polymers containing reactive terminal OH groups, and by subsequent conversion of the terminal OH groups to form anionic end groups, (A) being a monomer of formula (I) wherein A is $C_2$-$C_4$ alkylene and B is a $C_2$-$C_4$ alkylene different from A, k corresponds to the number 0 or 1, m is a number between 0 and 500, preferably between 0 and 50, n is a number between 0 and 500, preferably between 0 and 50, the sum of m+n being equal to between 1 and 1000; (B) contains an ethylenically unsaturated monomer containing an aromatic group; and (C) is an ethylenically unsaturated monomer containing an alkyl radical.

7 Claims, No Drawings

ANIONIC WATER-SOLUBLE ADDITIVES BASED ON ALLYL ETHER AND VINYL ETHER

The present invention relates to novel anionic copolymers useful as dispersants for waterborne pigment formulations and to a process for preparing these copolymers.

The hitherto customary novolak-based anionic dispersants contain as a consequence of their method of synthesis residues of alkylphenols, frequently nonylphenol, and ethoxylates thereof. Since alkylphenol ethoxylates, or their degradation products, scarcely undergo any degradation in the environment, they build up. This is problematic in that they have a hormonal effect on aquatic organisms. Therefore, many countries have adopted legislation (2003/53/EC for example) which limits or bans the use of materials containing alkylphenols or their ethoxylates in open-loop systems.

US 2005 085 563 describes dispersants obtained by copolymerization of vinyl-functionalized polyethers and styrene oxide.

EP-A-0 894 811 and EP-A-0 736 553 describe copolymers based on unsaturated carboxylic acid derivatives and oxyalkylene glycol alkyl ethers and also a dicarboxylic acid derivative that are useful in hydraulic binders, particularly cement. DE-A-100 17 667 describes the use of such copolymers for preparing aqueous pigment formulations.

Studies to date have shown that it is still extremely difficult to synthesize dispersants that are equivalent to anionic novolak systems. There is accordingly a need for novel dispersants that are capable of dispersing organic pigments in high concentration above 40% to low-viscosity dispersions. These dispersions shall be straightforward to produce, i.e., the pigments shall be readily wetted and be readily incorporated into the aqueous medium. The dispersion shall have a high and reproducible color strength and this shall remain stable for a period of several years. Similarly, all further coloristic parameters such as, for example, hue angle and chroma shall be reproducible and stable. Furthermore, the dispersion shall have a low viscosity; the pigments must neither agglomerate nor flocculate nor cream up or form a sediment. The dispersion should not foam or cause or speed foaming in the application medium. Furthermore, the dispersants should contribute to broad compatibility of the dispersions in various application media. Moreover, the dispersion shall be shear stable; i.e., its color strength or coloristics must not change under shearing, and the dispersion shall remain resistant to flocculation under these conditions.

It has now been found that, surprisingly, specific anionic comb copolymers, prepared by means of macromonomers composed of polyethylene/polypropylene glycol monovinyl or monoallyl ethers, achieve this object.

The present invention accordingly provides anionic modified copolymers obtainable by polymerization of the monomers (A), (B) and (C) to obtain a nonionic copolymer having reactive terminal OH groups and subsequent conversion of the terminal OH groups to anionic end groups such as e.g. sulfuric monoesters, wherein
(A) is a monomer of formula (I)

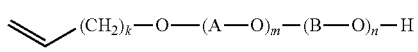

(I)

where
A represents $C_2$- to $C_4$-alkylene,
B represents a $C_2$- to $C_4$-alkylene other than A,
k equals 0 or 1,
m is from 0 to 500, preferably from 0 to 50,
n is from 0 to 500, preferably from 0 to 50,
provided the sum total of m+n is from 1 to 1000;
(B) is an ethylenically unsaturated monomer which contains an aromatic group; and
(C) is an ethylenically unsaturated monomer which contains an alkyl radical.

The copolymer of the present invention possesses customary terminal groups which are formed by the initiation of the free-radical polymerization or by chain transfer reactions or by chain termination reactions, for example a proton, a group derived from a free-radical initiator or a sulfur-containing group derived from a chain transfer reagent.

The anionic end groups can be sulfates, sulfosuccinates, carboxylates or phosphates.

The reactive terminal OH groups which are converted to the anionic end groups are situated in the polymer side chains formed from the monomers of formula (I).

The molar fraction of the monomers is preferably 1 to 80% for monomer (A), 0.1 to 80% for monomer (B) and 0.1 to 80% for monomer (C).

It is particularly preferable for the molar fraction of the monomers to be 10 to 70% for monomer (A), 10 to 60% for monomer (B) and 10 to 60% for monomer (C).

In preferred monomers (A) A represents ethylene and B represents propylene, or A represents propylene and B represents ethylene.

The alkylene oxide units $(A-O)_m$ and $(B-O)_n$ can be present either randomly or, in the case of a preferred embodiment, arranged blocklike.

The sum total of the alkylene oxide units can in principle be n+m=1 to 1000, preference being given to 1 to 500, particularly 2 to 100, more preferably 5 to 100.

Preferred monomers (B) can be described by formula (IIa) or (IIb):

(IIa)

where
$X_a$ represents an aromatic or araliphatic radical having 3 to 30 carbon atoms, which optionally contains one or more of the heteroatoms N, O and S,
$Z_a$ represents H or $(C_1-C_4)$-alkyl,
$Z_b$ represents H or $(C_1-C_4)$-alkyl,
$Z_c$ represents H or $(C_1-C_4)$-alkyl;

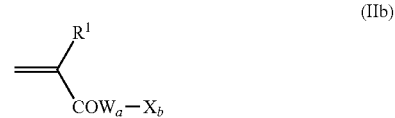

(IIb)

where
$R^1$ represents hydrogen or methyl,
$X_b$ represents an aromatic or araliphatic radical having 3 to 30 carbon atoms, which optionally contains one or more of the heteroatoms N, O and S,
$W_a$ represents oxygen or the group NH.

Monomers (B) include for example the following esters and amides of acrylic acid and methacrylic acid: phenyl, benzyl, tolyl, 2-phenoxyethyl, phenethyl.

Further monomers (B) are vinylaromatic monomers such as styrene and its derivatives such as for example vinyltoluene, alpha-methylstyrene. The aromatic unit may also comprise heteroaromatics, as in 1-vinylimidazole for example. Particularly preferred monomers (B) can be: styrene, 1-vinylimidazole, benzyl methacrylate, 2-phenoxyethyl methacrylate and phenethyl methacrylate.

Preferred monomers (C) can be described by formula (IIIa) or formula (IIIb):

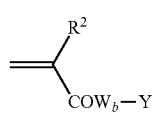

(IIIa)

where
$R^2$ represents hydrogen or methyl,
Y represents an aliphatic hydrocarbyl radical having 1 to 30 carbon atoms, preferably 6 to 30, particularly 9 to 20 carbon atoms, which may be linear or branched or else cyclic, and may contain the heteroatoms O, N and/or S and also be unsaturated,
$W_b$ represents oxygen or the group NH;

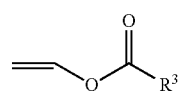

(IIIb)

where
$R^3$ represents an aliphatic hydrocarbyl radical having 1 to 30 carbon atoms, preferably 6 to 20, particularly 8 to 12 carbon atoms, which may be linear or branched or else cyclic, and may contain the heteroatoms O, N and/or S and also be unsaturated.

The monomers (C) include for example the following esters and amides of acrylic acid and methacrylic acid: methyl, ethyl, propyl, isopropyl, n-butyl, isobutyl, t-butyl, pentyl, hexyl, 2-ethylhexyl, 3,3-dimethylbutyl, heptyl, octyl, isooctyl, nonyl, lauryl, cetyl, stearyl, behenyl, cyclohexyl, trimethylcyclohexyl, t-butylcyclohexyl, bornyl, isobornyl, adamantyl, (2,2-dimethyl-1-methyl)propyl, cyclopentyl, 4-ethylcyclo-hexyl, 2-ethoxyethyl, tetrahydrofurfuryl and tetrahydropyranyl.

The monomers (C) further include the vinyl esters of carboxylic acids, such as, for example, vinyl laurate, vinyl myristate, vinyl stearate, vinyl behenate, vinyl pivalate, vinyl neohexanoate, vinyl neoheptanoate, vinyl neooctanoate, vinyl neononanoate, vinyl neodecanoate and vinyl neoundecanoate. It is likewise possible to use the vinyl esters of mixtures of such carboxylic acids.

The copolymers of the present invention have a molecular weight of $10^3$ g/mol to $10^9$ g/mol, more preferably $10^3$ to $10^7$ g/mol and even more preferably $10^3$ to $10^5$ g/mol.

Combining the monomers (A) with the aromatic and aliphatic monomers (B) and (C) makes it possible to emulate the properties of novolak-type dispersants such that a very similar performance profile is obtained.

In contradistinction to the polymers of the present invention, polymers having carboxylate groups on the polymer backbone are not suitable for preparing pigment dispersions having high concentrations of organic pigments of above 40%, since they lead to excessively high viscosities.

The copolymers of the present invention are obtainable by means of free-radical polymerization. The polymerization reaction can be carried out continuously, batchwise or semi-continuously.

The polymerization reaction is advantageously carried out as a precipitation polymerization, emulsion polymerization, solution polymerization, bulk polymerization or gel polymerization. Solution polymerization is particularly advantageous for the performance profile of the copolymers of the present invention.

Useful solvents for the polymerization reaction include all organic or inorganic solvents which are very substantially inert with regard to free-radical polymerization reactions, examples being ethyl acetate, n-butyl acetate or 1-methoxy-2-propyl acetate, and also alcohols such as for example ethanol, i-propanol, n-butanol, 2-ethylhexanol or 1-methoxy-2-propanol, similarly diols such as ethylene glycol and propylene glycol. It is also possible to use ketones such as acetone, butanone, pentanone, hexanone and methyl ethyl ketone, alkyl esters of acetic, propionic and butyric acids such as for example ethyl acetate, butyl acetate and amyl acetate, ethers such as tetrahydrofuran, diethyl ether and ethylene glycol monoalkyl ethers, ethylene glycol dialkyl ethers, polyethylene glycol monoalkyl ethers and polyethylene glycol dialkyl ethers. It is similarly possible to use aromatic solvents such as for example toluene, xylene or higher-boiling alkylbenzenes. It is similarly conceivable to use solvent mixtures, in which case the choice of solvent or solvents depends on the use intended for the copolymers of the present invention. Preference is given to using water; lower alcohols; preferably methanol, ethanol, propanols, iso-, sec- and t-butanol, 2-ethylhexanol, butyl glycol and butyl diglycol, more preferably isopropanol, t-butanol, 2-ethylhexanol, butyl glycol and butyl diglycol; hydrocarbons having 5 to 30 carbon atoms and mixtures and emulsions of the aforementioned compounds.

Methyl ethyl ketone, methyl isobutyl ketone and isopropanol are particularly preferred solvents.

The polymerization reaction is preferably carried out in the temperature range between 0 and 180° C., more preferably between 10 and 100° C., not only at atmospheric pressure but also under elevated or reduced pressure. Where appropriate, the polymerization can also be carried out under an inert gas atmosphere, preferably under nitrogen.

The polymerization can be initiated using high-energy electromagnetic rays, mechanical energy or the customary, chemical polymerization initiators such as organic peroxides, for example benzoyl peroxide, tert-butyl hydroperoxide, methyl ethyl ketone peroxide, cumoyl peroxide, dilauroyl peroxide (DLP), or azo initiators, for example azobisisobutyronitrile (AIBN), azobisamidopropyl hydrochloride (ABAH) and 2,2'-azobis(2-methylbutyronitrile) (AMBN). It is likewise possible to use inorganic peroxy compounds, for example $(NH_4)_2S_2O_8$, $K_2S_2O_8$ or $H_2O_2$, optionally combined with reducing agents (for example sodium hydrogensulfite, ascorbic acid, iron(II) sulfate) or redox systems which contain an aliphatic or aromatic sulfonic acid (for example benzenesulfonic acid, toluenesulfonic acid) as reducing component.

The usual compounds are used as molecular weight regulators. Suitable known regulators are for example alcohols, such as methanol, ethanol, propanol, isopropanol, n-butanol, sec-butanol and amyl alcohols, aldehydes, ketones, alkylthiols, for example dodecylthiol, tert-dodecylthiol, thiolglycolic acid, isooctyl thioglycolate and some halogen compounds, for example carbon tetrachloride, chloroform and methylene chloride.

Following the polymerization, the solvent is removed.

The nonionic polymer thus obtained, then, has, on the polyoxyalkylene side chains, reactive hydroxyl functions which are converted to anionic functionalities in a subsequent step. Examples of anionic functionalities are $SO_3M$, $CH_2COOM$, $PO_3M_2$ or sulfosuccinate. In these, M is as defined above.

The anionic copolymers of the present invention can be described for example by the formulae (IV), (V), (VI) or (VII).

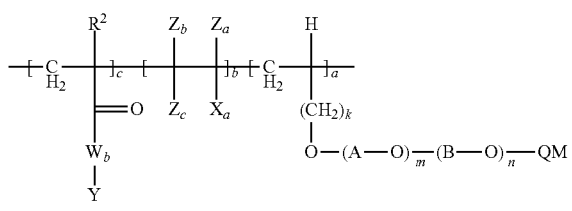

(IV)

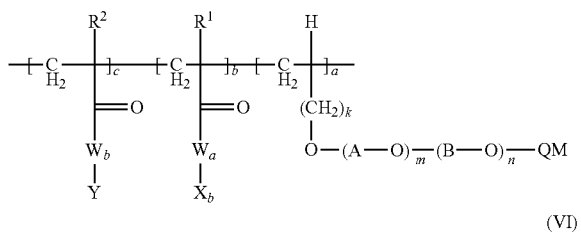

(V)

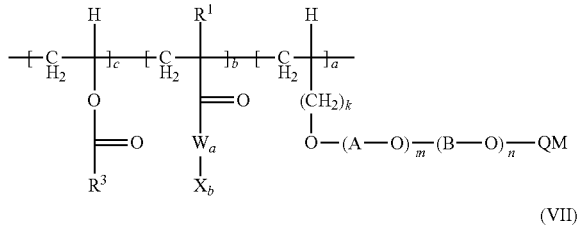

(VI)

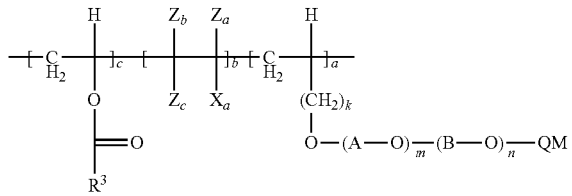

(VII)

The indices a, b and c indicate the molar fraction of the respective monomer (A), (B) and (C), viz.:
a=0.01-0.8
b=0.001-0.8
c=0.001-0.8
subject to the proviso that the sum total of a+b+c equals 1, and more preferably
a=0.1-0.7
b=0.1-0.6
c=0.1-0.6
subject to the proviso that the sum total of a+b+c equals 1.

In the formulae (IV), (V), (VI) and (VII), Q represents $SO_3$, $CH_2COO$, $PO_3M$, or QM

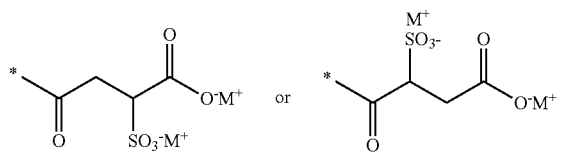

and M represents H, a monovalent metal cation, a divalent metal cation, $NH_4^+$, a secondary, tertiary or quaternary ammonium ion, or a combination thereof, or represents equivalents of di-, tri- or polyvalent metal ions such as for example $Ca^{2+}$ or $Al^{3+}$ (the asterisk * in the Markush formula indicates that there is a link to the polymer at this site).

In the case of the sulfosuccinates, the nonionic copolymers are first esterified with maleic anhydride for example. This can be done without solvent in that the reaction can be carried out in the polymer melt at elevated temperature. The maleic monoester obtained is subsequently sulfonated. To this end, it is reacted for example with sodium sulfite or sodium pyrosulfite in an aqueous solution. The aqueous solution of the sulfosuccinate sodium salt is obtained as product.

The sulfate esters are prepared by, for example, reacting the nonionic copolymers with sulfamic acid. This reaction is carried out in a melt of the nonionic copolymer by adding sulfamic acid. In the course of the reaction, the OH groups of the copolymer are converted into sulfate esters which are then present as ammonium salt Carboxymethylation, for example with sodium chloroacetate, can be used to convert the terminal hydroxyl functions into the corresponding polyether carboxylates.

The phosphoric esters are obtainable for example by reacting a melt of the nonionic copolymer with polyphosphoric acid or phosphorus pentoxide. Not only phosphoric monoesters but also diesters and triesters are obtainable in this reaction.

The present invention further provides for the use of the anionic copolymer of the present invention as a dispersant particularly for pigments and fillers, for example for waterborne pigment concentrates used for coloring emulsion and varnish colors, paints, coatings and printing inks, and also for coloring paper, cardboard and textiles.

SYNTHESIS EXAMPLES

Synthesis Prescription 1

General Prescription for Polymerization:

A flask equipped with stirrer, reflux condenser, internal thermometer and nitrogen inlet was initially charged with monomer A, monomer C and, where appropriate, the molecular weight regulator in solvent while nitrogen was being introduced. Then, the temperature was raised to 80° C. with stirring and a solution of the initiator was added during one hour by metering. At the same time, the metered addition was commenced of monomer B, and it was concluded after 3 hours. The batch was subsequently further stirred at this temperature for 2 hours, and then the solvent was removed under reduced pressure.

Synthesis Prescription 2

General Prescription for Polymerization

A flask equipped with stirrer, reflux condenser, internal thermometer and nitrogen inlet was initially charged with monomer A, monomer C and, where appropriate, the molecular weight regulator and component 1 (ascorbic acid) of the redox initiator system in solvent under nitrogen. Then, the temperature was raised to 80° C. with stirring and a solution of component 2 (t-BuOOH) of the redox initiator system was added during three hours by metering. At the same time the metered addition was commenced of monomer B, and it was concluded after 3 hours. The batch was subsequently further stirred at this temperature for 2 hours, and then the solvent was removed under reduced pressure.

Synthesis Prescription 3

General Synthesis Prescription for Converting the Polymers Obtained by Synthesis Prescription 1 or 2 to Anionic Copolymers Having Ether Sulfate Groups on the Side Chains The copolymer was initially charged with sulfamic acid and urea to a flask under nitrogen. Then, the initial charge was heated to 100° C. for 4 hours with stirring. Subsequently, pH 6.5 to 7.5 was set with 50% by weight aqueous sodium hydroxide solution. NMR spectroscopy verified a degree of conversion of >95% to the corresponding sulfuric ester ammonium salt.

Synthesis Prescription 4

General Synthesis Prescription for Converting the Polymers Obtained According to Synthesis Prescription 1 or 2 to Anionic Copolymers Having Sulfosuccinate Groups on the Side Chains The copolymer was initially charged to a flask under nitrogen. Then, maleic anhydride and sodium hydroxide were added and the mixture was heated with stirring to a temperature of 75 to 85° C. At this temperature, the mixture was stirred for three hours and then admixed with aqueous sodium sulfite solution (10% strength by weight) by metered addition. The mixture was stirred at 60 to 70° C. to complete the reaction and finally adjusted to pH 7 with 50% by weight aqueous sodium hydroxide solution.

The following three tables contain two-stage synthesis examples wherein the polymer is first prepared according to synthesis prescription 1 or 2 and then the anionic derivative of the polymer is prepared according to synthesis prescription 3 or 4.

AMBN=2,2'-azobis(2-methylbutyronitrile)

TABLE 1

| | 1 | 2 | 3 | 4 | 5 | 6 | 7 | 8 | 9 | 10 |
|---|---|---|---|---|---|---|---|---|---|---|
| Monomer C | | | | | | | | | | |
| 2-ethylhexyl methacrylate | 136.4 g | | | | | | | | | |
| lauryl methacrylate | | 175.0 g | | | | | | | | |
| stearyl methacrylate | | | | | 232.8 g | | | | | |
| isobornyl methacrylate | | | | | | | 152.9 g | | | |
| tetrahydrofurfuryl methacrylate | | | | | | | | | 117.1 g | |
| vinyl neononanoate | | | | 78.3 g | | | | | | 78.3 g |
| vinyl neodecanoate | | | 84.3 g | | | | | 84.3 g | | |
| vinyl neoundecanoate | | | | | | 90.3 g | | | | |
| Monomer B | | | | | | | | | | |
| 1-vinylimidazole | | | | | 64.7 g | | 64.7 g | | | |
| styrene | 71.6 g | 41.6 g | | 41.6 g | | | | | | 41.6 g |
| benzyl methacrylate | | | | | | 70.4 g | | 70.4 g | | |
| phenetheyl methacrylate | | | 130.8 g | | | | | | | |
| 2-phenoxyethyl methacrylate | | | | | | | | | 141.8 g | |
| Monomer A | | | | | | | | | | 300 g |
| polyglycol 1 | | 300 g | | 300 g | | 300 g | | | | |
| polyglycol 2 | 378.4 g | | 378.4 g | | 378.4 g | | | | 376.4 g | |
| polyglycol 3 | | | | | | | 688 g | | | |
| polyglycol 4 | | | | | | | | 3000 g | | |
| Initiator | | | | | | | | | | |
| AMBN | 16.5 g | 13.4 g | | 13.4 g | 16.5 g | 13.4 g | 16.5 g | 13.4 g | | |
| dibenzoyl peroxide | | | 20.8 g | | | | | | | |
| ascorbic acid/t-BuOOh | | | | | | | | | 17.51g/7.73g | 17.51g/7.73g |
| Regulator | | | | | | | | | | |
| dodecanethiol | 16.5 g | | 16.5 g | | 16.5 g | | 16.5 g | | 16.5 g | 13.4 g |
| ethyl mercaptan | | | | 4.2 g | | | | | | |
| Solvent | | | | | | | | | | |
| methyl ethyl ketone | 660 g | 660 g | | | 660 g | | | 660 g | 660 g | 660 g |
| methyl isobutyl ketone | | | 660 g | 660 g | | | | | | |
| isopropanol | | | | | | 660 g | 660 g | | | |
| polymerization by synthesis prescription | 1 | 1 | 1 | 1 | 1 | 1 | 1 | 1 | 2 | 2 |

TABLE 1-continued

|  | 1 | 2 | 3 | 4 | 5 | 6 | 7 | 8 | 9 | 10 |
|---|---|---|---|---|---|---|---|---|---|---|
| $M_w$ of polymer obtained | 14000 | 18500 | 10300 | 9000 | 12800 | 17900 | 15400 | 26200 | 11000 | 8800 |
| derivatization of polymer by synthesis prescription | 3 | 3 | 4 | 4 | 3 | 4 | 3 | 3 | 4 | 4 |
| sulfamic acid | 32.7 g | 51.9 g |  |  | 32.7 g |  | 49.1 g | 47.6 g |  |  |
| urea | 1.03 g | 1.63 g |  |  | 1.03 g |  | 1.55 g | 1.50 g |  |  |
| maleic anhydride |  |  | 33.7 g | 53.5 g |  | 53.5 g |  |  | 33.7 g | 53.5 g |
| NaOH |  |  | 1.10 g | 1.75 g |  | 1.75 g |  |  | 1.10 g | 1.75 g |
| sodium sulfite solution (10% strength in water) |  |  | 433 g | 687 g |  | 687 g |  |  | 433 g | 687 g |

TABLE 2

|  |  | 11 | 12 | 13 | 14 | 15 | 16 | 17 | 18 | 19 | 20 |
|---|---|---|---|---|---|---|---|---|---|---|---|
| Monomer C | 2-ethylhexyl methacrylate | 136.4 g |  |  |  |  |  |  |  |  |  |
|  | lauryl methacrylate |  |  | 175.0 g |  |  |  |  |  |  |  |
|  | stearyl methacrylate |  |  |  |  | 232.8 g |  |  |  |  |  |
|  | isobornyl methacrylate |  |  |  |  |  |  | 152.9 g |  |  |  |
|  | tetrahydrofurfuryl methacrylate |  |  |  |  |  |  |  |  | 117.1 g |  |
|  | vinyl neononanoate |  |  |  | 78.3 g |  |  |  |  |  | 78.3 g |
|  | vinyl neodecanoate |  | 84.3 g |  |  |  |  |  | 84.3 g |  |  |
|  | vinyl neoundecanoate |  |  |  |  |  | 90.3 g |  |  |  |  |
| Monomer B | 1-vinylimidazole |  |  |  |  |  | 64.7 g |  | 64.7 g |  |  |
|  | styrene | 71.6 g | 41.6 g |  | 41.6 g |  |  |  |  |  | 41.6 g |
|  | benzyl methacrylate |  |  |  |  |  |  | 70.4 g | 70.4 g |  |  |
|  | phenethyl methacrylate |  |  | 130.8 g |  |  |  |  |  |  |  |
|  | 2-phenoxyethyl methacrylate |  |  |  |  |  |  |  |  | 141.8 g |  |
| Monomer A | polyglycol 5 |  |  |  |  |  | 210 g |  |  |  |  |
|  | polyglycol 6 |  | 300 g |  | 300 g |  |  |  | 300 g |  | 300 g |
|  | polyglycol 7 | 378.4 g |  | 378.4 g |  | 378.4 g |  | 378.4 g |  | 378.4 g |  |
| Initiator | AMBN | 16.5 g | 13.4 g |  | 13.4 g | 16.5 g | 13.4 g |  | 13.4 g |  |  |
|  | dibenzoyl peroxide |  |  | 20.8 g |  |  |  | 20.8 g |  |  |  |
|  | ascorbic acid/t-BuOOH |  |  |  |  |  |  |  |  | 17.51 g/7.73 g | 17.51 g/7.73 g |
| Regulator | dodecanethiol |  | 13.4 g | 16.5 g |  |  | 13.4 g | 16.5 g |  |  | 13.4 g |
|  | ethyl mercaptan |  |  |  | 4.2 g |  |  |  | 4.2 g |  |  |
| Solvent | methyl ethyl ketone | 660 g | 660 g |  |  | 660 g | 660 g |  |  | 660 g | 660 g |
|  | methyl isobutyl ketone |  |  | 660 g | 660 g |  |  |  |  |  |  |
|  | isopropanol |  |  |  |  |  |  | 660 g | 660 g |  |  |
|  | by synthesis prescription | 1 | 1 | 1 | 1 | 1 | 1 | 1 | 1 | 2 | 2 |
|  | $M_w$ of polymer obtained | 16200 | 7500 | 6100 | 8200 | 14600 | 7000 | 15000 | 8900 | 14700 | 9200 |
|  | derivatization of polymer by synthesis prescription | 4 | 4 | 4 | 3 | 3 | 4 | 4 | 3 | 3 | 3 |
|  | sulfamic acid |  |  |  | 57.1 g | 36.0 g |  |  | 57.1 g | 36.0 g | 57.1 g |
|  | urea |  |  |  | 1.80 g | 1.14 g |  |  | 1.80 g | 1.14 g | 1.80 g |
|  | maleic anhydride | 37.1 g | 58.8 g | 37.1 g |  |  | 58.8 g | 37.1 g |  |  |  |
|  | NaOH | 1.21 g | 1.92 g | 1.21 g |  |  | 1.92 g | 1.21 g |  |  |  |
|  | sodium sulfite solution (10% strength in water) | 476 g | 756 g | 476 g |  |  | 756 g | 476 g |  |  |  |

TABLE 3

|  |  | 21 | 22 | 23 | 24 | 25 | 26 | 27 | 28 | 29 | 30 |
|---|---|---|---|---|---|---|---|---|---|---|---|
| Monomer C | 2-ethylhexyl methacrylate | 136.4 g |  |  |  |  |  |  |  |  |  |
|  | lauryl methacrylate |  |  | 175.0 g |  |  |  |  |  |  |  |
|  | stearyl methacrylate |  |  |  |  | 232.8 g |  |  |  |  |  |
|  | isobornyl methacrylate |  |  |  |  |  |  | 152.9 g |  |  |  |
|  | tetrahydrofurfuryl methacrylate |  |  |  |  |  |  |  |  | 117.1 g |  |
|  | vinyl neononanoate |  |  |  | 78.3 g |  |  |  |  |  |  |
|  | vinyl neodecanoate |  | 84.3 g |  |  |  |  |  | 84.3 g |  | 78.3 g |
|  | vinyl neoundecanoate |  |  |  |  |  | 90.3 g |  |  |  |  |
| Monomer B | 1-vinylimidazole |  |  |  |  |  | 64.7 g |  | 64.7 g |  |  |
|  | styrene | 71.6 g | 41.6 g |  | 41.6 g |  |  |  |  |  | 41.6 g |

TABLE 3-continued

| | | 21 | 22 | 23 | 24 | 25 | 26 | 27 | 28 | 29 | 30 |
|---|---|---|---|---|---|---|---|---|---|---|---|
| | benzyl methacrylate | | | | | | 70.4 g | | 70.4 g | | |
| | phenethyl methacrylate | | | 130.8 g | | | | | | | |
| | 2-phenoxyethyl methacrylate | | | | | | | | | 141.8 g | |
| Monomer A | polyglycol 8 | | 300 g | | | 300 g | | 300 g | | | 300 g |
| | polyglycol 9 | 429 g | | | 429 g | | | | | 429 g | |
| | polyglycol 10 | | | 876 g | | | 876 g | | | | |
| | polyglycol 11 | | | | | | 1224 g | | | | 1224 g |
| Initiator | AMBN | 16.5 g | 13.4 g | | 13.4 g | 16.5 g | 13.4 g | | 13.4 g | | |
| | dibenzoyl peroxide | | | 20.8 g | | | | 20.8 g | | | |
| | ascorbic acid/t-BuOOH | | | | | | | | | 17.51 g/7.73 g | 17.51 g/7.73 g |
| Regulator | dodecanethiol | 16.5 g | 13.4 g | | | 16.5 g | | | | 16.5 g | 13.4 g |
| | ethyl mercaptan | | | | 4.2 g | | | | 4.2 g | | |
| Solvent | methyl ethyl ketone | 660 g | 660 g | | | 660 g | 660 g | | | 660 g | 660 g |
| | methyl isobutyl ketone | | | 660 g | 660 g | | | 660 g | 660 g | | |
| | isopropanol | | | | | | | | | 660 g | 660 g |
| | by synthesis prescription | 1 | 1 | 1 | 1 | 1 | 1 | 1 | 1 | 2 | 2 |
| | M$_w$ of polymer obtained | 8400 | 7900 | 13900 | 9000 | 8100 | 26200 | 15000 | 8600 | 8900 | 24800 |
| | derivatization of polymer by synthesis prescription | 3 | 4 | 4 | 3 | 3 | 4 | 3 | 3 | 4 | 4 |
| | sulfamic acid | 54.4 g | | | 54.4 g | 57.1 g | | 55.6 g | 57.1 g | | |
| | urea | 1.72 g | | | 1.72 g | 1.80 g | | 1.76 g | 1.80 g | | |
| | maleic anhydride | | 58.8 g | 57.3 g | | | 57.2 g | | | 56.1 g | 57.2 g |
| | NaOH | | 1.92 g | 1.87 g | | | 1.87 g | | | 1.83 g | 1.87 g |
| | sodium sulfite solution (10% strength in water) | | 756 g | 736 g | | | 734 g | | | 720 g | 734 g |

Monomer A of Tables 1 to 3:

Polyglycol 1 polyalkylene glycol monovinyl ether (formula (I), k=0, n=0, m=11.5; (A-O) is (CH$_2$CH$_2$O)), molar mass about 550 g/mol Polyglycol 2 polyalkylene glycol monovinyl ether (formula (I), k=0, n=0, m=24; (A-O) is (CH$_2$CH$_2$O)), molar mass about 1100 g/mol Polyglycol 3 polyalkylene glycol monovinyl ether (formula (I), k=0, n=0, m=44.5; (A-O) is (CH$_2$CH$_2$O)), molar mass about 2000 g/mol Polyglycol 4 polyalkylene glycol monovinyl ether (formula (I), k=0, n=0, m=135.4; (A-O) is (CH$_2$CH$_2$O)), molar mass about 6000 g/mol Polyglycol 5 polyalkylene glycol monoallyl ether (formula (I), k=1, n=0, m=6.6; (A-O) is (CH$_2$CH$_2$O)), molar mass about 350 g/mol Polyglycol 6 polyalkylene glycol monoallyl ether (formula (I), k=1, n=0, m=10; (A-O) is (CH$_2$CH$_2$O)), molar mass about 500 g/mol Polyglycol 7 polyalkylene glycol monoallyl ether (formula (I), k=1, n=0, m=21.4; (A-O) is (CH$_2$CH$_2$O)), molar mass about 1000 g/mol Polyglycol 8 polyalkylene glycol monoallyl ether (formula (I), k=1, ethylene oxide/propylene oxide 6:4 (random polymer), molar mass about 500 g/mol Polyglycol 9 polyalkylene glycol monoallyl ether (formula (I), k=1, ethylene oxide (B-O)/propylene oxide (A-O) 11:4 (block copolymer), molar mass about 750 g/mol Polyglycol 10 polyalkylene glycol monoallyl ether (formula (I), k=1, ethylene oxide (B-O)/propylene oxide (A-O) 20:10 (block copolymer), molar mass about 1500 g/mol Polyglycol 11 polyalkylene glycol monoallyl ether (formula (I), k=1, ethylene oxide/propylene oxide 20:20 (random polymer), molar mass about 2100 g/mol

USE EXAMPLE

Production of a Pigment Formulation

The pigment, in the form alternatively of powder, granulate or presscake, was pasted up in deionized water together with the dispersants and the other adjuvants and then homogenized and predispersed using a dissolver (for example from VMA-Getzmann GmbH, type AE3-M1) or some other suitable apparatus. Fine dispersion was subsequently effected using a bead mill (for example AE3-M1 from VMA-Getzmann) or else some other suitable dispersing assembly, with milling being carried out with siliquartzite beads or zirconium mixed oxide beads of size d=1 mm, accompanied by cooling, until the desired color strength and coloristics were obtained. Thereafter, the dispersion was adjusted with deionized water to the desired final pigment concentration, the grinding media separated off and the pigment formulation isolated.

Evaluation of a Pigment Formulation:

Color strength and hue were determined in accordance with DIN 55986. The rub-out test was carried out by applying the emulsion color, after mixing with the pigment dispersion, to a paint card. Subsequently, the applied coating was rubbed with the finger on the lower part of the paint card. Incompatibility was present if the rubbed area is then more strongly or brightly colored than the adjacent area not aftertreated (the rub-out test is described in DE 2 638 946). Color strength and compatibilities with the medium to be colored was determined using an emulsion color for exteriors (waterborne, 20% TiO$_2$).

Viscosity was determined using a cone-and-plate viscometer (Roto Visco 1) from Haake at 20° C. (titanium cone: Ø 60 mm, 1°), the relationship between viscosity and shear rate in a range between 0 and 200 s$^{-1}$ being investigated. Viscosities were measured at a shear rate of 60 s$^{-1}$.

To evaluate the storage stability of the dispersions, viscosity was measured directly after production of the preparation and also after four weeks' storage at 50° C.

The pigment formulation described in the example which follows was produced by the method described above wherein the following constituents were used in the stated amounts such that 100 parts of the pigment formulation are formed. Parts are by weight in the example below:

50 parts C.I. Pigment Blue 15
6 parts polymer from synthesis example 11
2 parts wetter 8 parts ethylene glycol
0.2 part preservative
33.8 parts water The pigment formulation has a high color strength in the white dispersion and is stable. The rub-out test does not show up any color strength differences compared with the rubbed area. The dispersion proves to be very flowable and storage stable since it is still very flowable after 28 days' storage at 50° C. Viscosity in the as-produced state is 681 mPa·s.

What is claimed is:

1. An anionic modified copolymer obtained by polymerization of the monomers (A), (B) and (C) to obtain a nonionic copolymer having reactive terminal OH groups and conversion of the terminal OH groups to anionic end groups, wherein the anionic end groups are radicals $SO_3M$, $CH_2COOM$, $PO_3M_2$ or sulfosuccinate, where M is H, a monovalent metal cation, a divalent metal cation, $NH_4^+$, a secondary, tertiary ammonium ion, quaternary ammonium ion or a combination thereof, (A) is a monomer of formula (I)

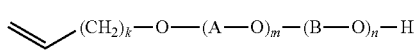

wherein
A is $C_2$- to $C_4$-alkylene,
B is a $C_2$- to $C_4$-alkylene other than A,
k equals 0 or 1,
m is from 0 to 500,
n is from 0 to 500,
provided the sum total of m+n is from 1 to 1000;
wherein the monomer (B) is a compound of formula (IIa) or (IIb):

wherein
$X_a$ is an aromatic or araliphatic radical having 3 to 30 carbon atoms, optionally containing one or more of the heteroatoms N, O or S,
$Z_a$ is H or $(C_1-C_4)$-alkyl,
$Z_b$ is H or $(C_1-C_4)$-alkyl,
$Z_c$ is H or $(C_1-C_4)$-alkyl;

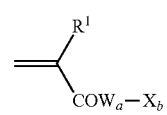

wherein
$R^1$ is hydrogen or methyl,
$X_b$ is an aromatic or araliphatic radical having 3 to 30 carbon atoms, optionally containing one or more of the heteroatoms N, O or S,
$W_a$ is oxygen or the NH; and
wherein the monomer (C) is a compound of formula (IIIa) or formula (IIIb):

wherein
$R^2$ is hydrogen or methyl,
Y is an aliphatic hydrocarbyl radical having 1 to 30 carbon atoms,
which optionally is linear or branched or cyclic, and optionally contains the heteroatoms O, N, S, or a combination thereof or optionally is unsaturated,
$W_b$ is oxygen or the NH;

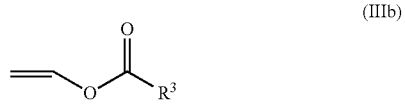

wherein
$R^3$ is an aliphatic hydrocarbyl radical having 1 to 30 carbon atoms, which optionally is linear or branched or cyclic, and optionally contains the heteroatoms O, N, S or a combination thereof or is optionally unsaturated.

2. The copolymer as claimed in claim 1, wherein the molar fraction of the monomers is 1 to 80% for monomer (A), 0.1 to 80% for monomer (B), and 0.1 to 80% for monomer (C).

3. The copolymer as claimed in claim 1, wherein A is ethylene and B is propylene or A is propylene and B is ethylene.

4. The copolymer as claimed in claim 1, wherein the copolymer is of the formulae (IV), (V), (VI) or (VII)

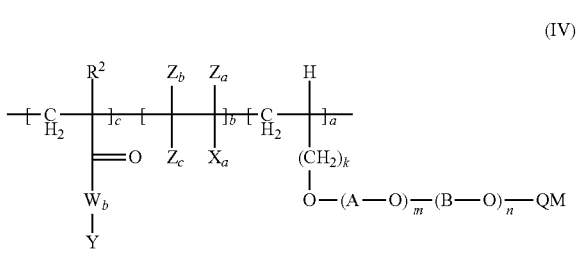

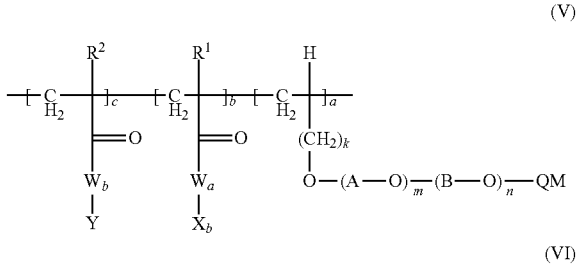

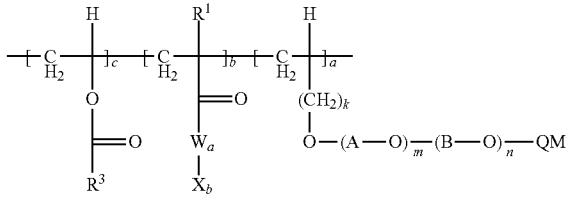

-continued

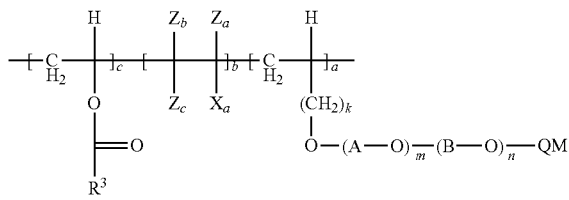

(VII)

wherein
A is $C_2$-$C_4$-alkylene,
B is a $C_2$-$C_4$-alkylene other than A,
m is from 0 to 500,
n is from 0 to 500,
provided the sum total of m+n is from 1 to 1000,
$X_a$ is an aromatic or araliphatic radical having 3 to 30 carbon atoms optionally containing one or more of the heteroatoms N, O or S,
$Z_a$ is H or ($C_1$-$C_4$)-alkyl,
$Z_b$ is H or ($C_1$-$C_4$)-alkyl,
$Z_c$ is H or ($C_1$-$C_4$)-alkyl,
$R^2$ is hydrogen or methyl,
Y is an aliphatic hydrocarbyl radical having 1 to 30 carbon atoms, optionally linear or branched or cyclic, and optionally contains the heteroatoms O, N, or S, or is unsaturated,
$W_b$ is oxygen or an NH group,
$R^1$ is hydrogen or methyl,
$X_b$ is an aromatic or araliphatic radical having 3 to 30 carbon atoms, optionally containing one or more of the heteroatoms N, O or S,
$W_a$ is oxygen or an NH group,
$R^3$ is an aliphatic hydrocarbyl radical having 1 to 30 carbon atoms, optionally linear or branched or cyclic, and optionally contains heteroatoms O, N S and optionally is unsaturated
a=0.01 to 0.8; b=0.001 to 0.8; c=0.001 to 0.8
provided the sum total of a+b+c equals 1,
Q is $SO_3$, $CH_2COO$, $PO_3M$ or sulfosuccinate, where M is H, a monovalent metal cation, a divalent metal cation, $NH_4^+$, a secondary, tertiary or quaternary ammonium ion, or a combination thereof.

5. A process for preparing a copolymer as claimed in claim 1, comprising the steps of free-radically polymerizing the monomers (A), (B) and (C) and converting the resulting terminal OH groups to anionic end groups.

6. A dispersant comprising a copolymer as claimed in claim 1.

7. A pigment dispersant or filler dispersant comprising a copolymer as claimed in claim 1.

* * * * *